United States Patent [19]
Mitchell et al.

[11] Patent Number: 6,010,639
[45] Date of Patent: Jan. 4, 2000

[54] CONTROLLED RELEASE SUPPLEMENTAL COOLANT ADDITIVE

[75] Inventors: Wayne A. Mitchell; Kurt D. Heinz, both of Crystal Lake, Ill.; Clifford Alvin Ferrin, Jr., Baltimore, Md.; Narender Pal Luthra, Simpsonville, S.C.

[73] Assignee: BetzDearborn Inc., Trevose, Pa.

[21] Appl. No.: 08/974,360

[22] Filed: Nov. 19, 1997

Related U.S. Application Data

[62] Division of application No. 08/668,171, Jun. 21, 1996, Pat. No. 5,741,433.

[51] Int. Cl.[7] ............................... C09K 3/18; C09K 5/00
[52] U.S. Cl. ............................ 252/176; 252/71; 252/74; 252/76; 422/7; 428/407
[58] Field of Search ............................................... 252/176

[56] References Cited

U.S. PATENT DOCUMENTS

| | | | |
|---|---|---|---|
| 3,977,992 | 8/1976 | Hofacker | 252/316 |
| 4,561,981 | 12/1985 | Characklis | 210/696 |
| 4,673,527 | 6/1987 | Goudy, Jr. et al. | 252/181 |
| 4,717,495 | 1/1988 | Hercamp et al. | 252/75 |
| 4,728,452 | 3/1988 | Hansen | 252/75 |
| 4,756,844 | 7/1988 | Walles et al. | 252/95 |
| 5,050,549 | 9/1991 | Sturmon | 123/198 E |
| 5,089,041 | 2/1992 | Thompson et al. | 71/64.11 |
| 5,120,349 | 6/1992 | Stewart et al. | 71/93 |
| 5,186,732 | 2/1993 | Thompson et al. | 71/64.11 |
| 5,337,705 | 8/1994 | Lane | 123/41.33 |
| 5,407,594 | 4/1995 | Fry et al. | 252/90 |
| 5,643,351 | 7/1997 | Lew et al. | 71/64.13 |
| 5,741,433 | 4/1998 | Mitchell et al. | 252/74 |

FOREIGN PATENT DOCUMENTS

| | | |
|---|---|---|
| 814909 | 6/1969 | Canada . |
| 6605917 | 10/1966 | Netherlands . |
| 1455250 | 11/1976 | United Kingdom . |

*Primary Examiner*—Ellen M. McAvoy
*Attorney, Agent, or Firm*—Greenblum & Bernstein, P.L.C.

[57] ABSTRACT

A controlled-release supplement coolant additive for use in diesel engine coolant systems comprising a core containing at least one supplemental coolant additive (SCA) active component and a polymeric coating material encapsulating said core. The controlled released supplement coolant additive slowly releases the SCA active components to a diesel engine coolant system, thereby delivering an effective concentration level of SCA active components over an extended period. The controlled-release supplement coolant additive maintains a minimum concentration level of active SCA components in the coolant system. Additionally, the controlled-release supplemental coolant additive prevents overdosing the coolant system with particular SCA active components such as nitrates.

11 Claims, No Drawings

CONTROLLED RELEASE SUPPLEMENTAL COOLANT ADDITIVE

This is a divisional of application Ser. No. 08/668,171 filed Jun. 21, 1996, now U.S. Pat. No. 5,741,433.

FIELD OF INVENTION

The present invention relates to a controlled-release additive for use in water treatment systems, particularly coolant and hot water systems, for example, cooling towers and diesel engine coolant systems, and to a method of using said additive. The controlled release additive comprises a water-soluble core containing at least one water treatment chemical and a polymeric coating material encapsulating said core which slowly releases the water treatment chemical into the water treatment system, thereby delivering an effective level of the water treatment chemical to the water treatment system over an extended period. The present invention more particularly relates to a controlled release supplemental coolant additive (SCA) for use in diesel engine coolant systems comprising a core containing at least one SCA active component and a polymeric coating material encapsulating said core. The use of the controlled released supplement coolant additive provides for the controlled release of the SCA composition into the diesel engine coolant system over an extended period, thereby maintaining a consistent concentration of SCA active components in the coolant system within a desired range.

BACKGROUND OF THE INVENTION

Historically, in order to prevent scale deposition, corrosion of metal surfaces and similar fouling of water treatment systems, as well to maintain proper pH levels, anti-foulants, anti-scaling agents, corrosion inhibitors, buffering and pH agents, microcides and the like have been added directly to water treatment systems on an as needed basis. Typically, a system is monitored, such as by recovering and analyzing a sample, in order to determine the current level of particular chemical treatment agents. When the concentration of a particular agent falls below a desired level, additional agent is added to the system.

Numerous techniques have been used in the past to treat coolant systems. For example, antifreeze compositions have been formulated to meet the demands of automobile engine coolant systems. However, conventional antifreeze compositions are insufficient to meet the unique demands imposed on diesel engine coolant systems. As a result, supplemental coolant additives (SCA) are added to diesel engine coolant systems to make up for the deficiencies of antifreeze formulations. Typically, supplemental coolant additives are added to the diesel engine coolant system at each oil change in order to replace additives which have been diluted or depleted from the system.

Other methods of introducing supplemental coolant additives to the diesel engine coolant system have been developed. For instance, it is known to add a solid SCA material directly to the diesel engine coolant system which dissolves in the coolant system. In this manner, it is expected that a minimum level of supplemental coolant additives will remain in the diesel engine coolant system for a predetermined time. However, there are significant drawbacks to using a solid SCA material including the danger of overdosing the system with particular additives which can result in erosion and corrosion problems. Further, this technique does not maintain a consistent concentration level of supplemental coolant additives within the system.

Another attempt to deliver supplemental coolant additives to a diesel engine system is the use of coolant filters which contain supplemental coolant additives. These devices operate as bypass filters with coolant flowing through the filter and extracting the supplemental coolant additive. Although the use of coolant filters is all improvement over the use of a supplemental coolant additive block, the danger of overdosing the system still exists and a controlled, minimal concentration level of supplemental coolant additives cannot be maintained within the system.

Minimal attempts have been made in the prior art to address particular water treatment systems by using controlled release capsules. U.S. Pat. No. 4,561,981 issued on Dec. 31, 1985 to William G. Characklis discloses a method for controlling, preventing or removing fouling deposits, particularly in pipelines, storage tanks and the like by microencapsulating fouling control chemicals in a slow release capsule. The encapsulating material is described as being any material compatible with the fouling control chemical which is capable of sticking to the fouling deposit site. A likely result of introducing the encapsulating material directly into the water treatment system is that the encapsulating material will deteriorate and create additional corrosion problems. Further, due to the sticky nature of Characklis' controlled release capsule it is unsuitable for use in engine coolant systems.

Controlled release formulations are well known in the art for non-water treatment applications. U.S. Pat. No. 5,186,732 issued Feb. 16, 1993 to Harold E. Thompson et al. discloses an encapsulated slow release fertilizer which provides prolonged leaching of a water soluble agent by utilizing an encapsulated coating comprises a water-borne, polyvinylidene chloride based latex composition. U.S. Pat. No. 5,120,349 issued Jun. 9, 1992 to Ray F. Stewart et al. provides a microcapsule having a heat sensitive crystallizable polymeric coating comprising a polymer backbone and 1 to 10% of a polar functional group. However, neither of the patents teaches encapsulating conventional water treatment chemicals such as anti-scaling agents, corrosion inhibitors, anti-foulants and the like for use in the treatment of water systems.

Despite the efforts of the prior art, a need still exists for a controlled release water treatment chemical which will provide a consistent level of treatment chemicals to the system over an extended period of time. In particular, the prior art has failed to develop a controlled release supplemental coolant additive which slowly releases supplement coolant additive (SCA) components to a diesel engine coolant system. Such a controlled release supplement coolant additive should deliver a consistent concentration of SCA components to a diesel engine coolant system, should not overdose the system with SCA components and should be capable of maintaining an effective concentration level of SCA compositions over a desired period of time.

SUMMARY OF THE INVENTION

Accordingly, it is an object of the present invention to provide a controlled release additive for water treatment systems in order to maintain an effective level of water treatment chemicals in the water treatment system.

It is another object of the present invention to provide a controlled release supplemental coolant additive for diesel engine coolant systems which slowly releases one or more supplemental coolant additive (SCA) components into the diesel engine coolant system.

It is a further object of the present invention to provide a controlled release supplemental coolant additive which delivers an effective consistent level of SCA components in a diesel engine coolant system over an extended period.

It is an additional object of the present invention to provide a controlled release supplemental coolant additive which maintains a desired concentration range of SCA components in a diesel engine coolant system for at least thirty days or 10,000 miles.

It is a further object of the present invention to provide a controlled release supplemental coolant additive which maintains a minimum concentration level of about 800 ppm of nitrite or a mixture nitrite and molybdate.

It is yet another object of the present invention to provide a controlled release supplemental coolant additive which maintains a desired concentration range of SCA components in a diesel engine coolant system for about 2,500 service hours or 100,000 miles.

It also is an object of the present invention to provide a controlled release supplemental coolant additive which prevents the introduction of ultra high dosages of SCA additives to a diesel engine coolant system.

It is still another object of the present invention to provide a controlled release supplemental coolant additive which prevents the introduction of ultra high levels of nitrites to a diesel engine system.

It is an additional object of the present invention to provide a controlled release supplemental coolant additive which maintains at least a minimum level of SCA components over an extended period.

Additional objects, advantages and novel features of the invention will be set forth in the description which follows, and will become apparent to those skilled in the art upon examination of the following specification or may be learned by practice of the invention.

DETAILED DESCRIPTION

The present invention relates to a controlled release supplemental coolant additive for use in coolant or hot water systems, particularly for use in diesel engine coolant systems. The controlled release supplemental coolant additive (SCA) comprises a core containing a water-soluble supplemental coolant additive composition and a coating material encapsulating said core which enables the slow release of the supplemental coolant additive composition into the diesel engine coolant system. Any type of coating material conventionally known in the art which provides controlled-release properties may be used in the present invention. However, the use of a water soluble coating material results in the components of the coating material dissolving into the diesel engine coolant system. These dissolved components may have the effect of contaminating or fouling the system which is being treated. Thus, it is preferred that the coating material be a water-insoluble, water-insoluble/glycol insoluble, or partially water soluble polymeric material. By providing a coating material which does not dissolve appreciably in water or a water/glycol mixture, the coating material easily can be prevented from contaminating or fouling the system, such as by retaining the coating material within a filtering environment. Thus, the maximum solubility of the polymeric coating material in the coolant system should be no more than about 5.0% by weight, based on the weight of the coating material.

The SCA composition comprises a mixture of conventional inhibiting and buffering agents typically used in diesel engine coolant systems. Preferably, the SCA composition comprises (1) a buffering component to maintain a neutral or alkaline pH, including for example, alkali metal salts or ammonium phosphates, borates and the like, (2) a cavitation liner pitting inhibitor component, including for example, alkali metal or ammonium nitrites, molybdates and the like, (3) a metal corrosion and hot surface corrosion inhibitor component, including for example, alkali metal and ammonium nitrates and silicates, dicarboxylic acids, azoles, sulfonic acids, mercaptobenzothiazoles and the like, (4) a defoaming agent component including for example, silicone defoamers, alcohols such as polyethoxylated glycol, polypropoxylated glycol or acetylenic glycols and the like, (5) a hot surface deposition and scale inhibitor component including for example, phosphate esters, phosphino carboxylic acid, polyacrylates, styrene-maleic anhydride copolymers, sulfonates and the like, (6) a dispersing component, including for example, non-ionic and/or anionic surfactants such as phosphate esters, sodium alkyl sulfonates, sodium aryl sulfonates, sodium alkylaryl sulfonates, linear alkyl benzene sulfonates, alkylphenols, ethoxylated alcohols, carboxylic esters and the like.

Preferably, the SCA composition is formulated with a sufficient amount of at least one cavitation liner pitter component in the form of nitrite compounds or a mixture of nitrite compounds and molybdate compounds to maintain a minimum concentration level of about 800 ppm of nitrite or a mixture of nitrite and molybdate in the coolant system, with the proviso that the minimum level of nitrite in the coolant system is about 400 ppm.

Typical SCA compositions contain a mixture of one or more of the active components provided in the following Table 1.

TABLE 1

SCA Active Components

| Component | Function | Range % |
|---|---|---|
| Alkali metal or ammonium phosphates | corrosion inhibitor/ buffering agent | 0–80 |
| Alkali metal or ammonium borate | corrosion inhibitor/ buffering agent | 0–80 |
| Alkali metal or ammonium nitrites | cavitation liner pitting/corrosion inhibitor | 4–60 |
| Alkali metal or ammonium molybdates | cavitation liner pitting/corrosion inhibitor | 4–60 |
| Alkali metal or ammonium nitrates | corrosion inhibitor | 0–40 |
| Alkali metal or ammonium silicates | corrosion inhibitor | 0–40 |
| Alkali metal or ammonium salts of one or more neutralized dicarboxylic acids | corrosion inhibitor | 1–15 |
| Tolyltriazole | corrosion inhibitor | 1–15 |
| Dispersants (e.g. polyacrylic acid, phosphino carboxylic acid, phosphate esters, styrene-maleic anhydride copolymers, polmaleic acid, sulfonates and sulfonate copolymers) | deposition and scale inhibitor | 0–15 |
| Defoamers (e.g. silicones, polyethyoxylated glycol, polypropoxylated glycol, acteylenic glycols) | foam inhibitor | 0–3 |

The SCA composition may be in solid, granular or particulate form provided that it does not decompose or melt at processing temperatures. Preferably, the SCA composition is molded in the form of a pellet or tablet which may have either a spherical or irregular shape. The SCA pellet or tablet should be of sufficient size to provide the steady controlled release of the SCA composition into the coolant system over the desired period of time. Further, when the SCA pellet or tablet is used in a filtering environment, it should be larger than the pores or orifices of the filter. Generally, a spherical pellet or tablet should have a diameter on the order of from about 1/32" to about 3.0", preferably from about 1/32" to about 1½", and more preferably from about ⅛" to about ½". An irregularly shaped pellet or table should be on the order of from about 1/16"×1/16" to about 3.0"×3.0", preferably from about ⅛"×⅛" to about 1½"×1½", and more preferably from about 3/16"×3/16" to about ½"×½".

The formation of the SCA composition into a pellet or tablet is dependent upon the mixture of components contained therein. For example, when the SCA composition contains a sufficient amount of a dispersing agent or a mixture of dispersing agents, the dispersing agent or mixture also may function as a binder, thereby allowing the composition to be molded or compressed directly into the form of a pellet or tablet. If the SCA composition does not compact well, a binder must be added to the SCA composition in order to mold or compress it into a pellet or tablet. Suitable binders include, for example, polyvinyl pyrrolidone, sodium acrylate, sodium polyacrylate, carboxymethylcellulose, sodium carboxyinethylcellulose, sodium hydroxypropylcellulose, corn starch, microcrystalline cellulose, propylene glycol, ethylene glycol, sodium silicate, potassium silicate, methacrylate/acrylate copolymers, sodium lignosulfonate and water. Preferably, the SCA composition to be molded or compressed into a pellet or table further comprises a die release agent. Suitable die release agents include, for example, calcium stearate, magnesium stearate, zinc stearate, stearic acid, propylene glycol, ethylene glycol, polyethylene glycol, polypropylene glycol, polyoxypropylene-polyoxyethylene block copolymers, microcrystalline cellulose, kaolin, attapulgite, magnesium carbonate, fumed silica, magnesium silicate, calcium silicate, silicones, mono-and dicarboxylic acids and corn starch.

The coating material for encapsulating the SCA pellet or tablet preferably is a water-insoluble, water-insoluble/glycol insoluble, or partially water soluble polymeric material which does not dissolve appreciably in water or a water/glycol mixture. The coating material should be capable of providing the controlled release of the SCA composition into the coolant system for at least about 1 month (30 days) which is equal to about 240 service hours or about 9600 miles. Preferably, the coating material should be capable of providing the controlled release of the SCA composition into the coolant system for about 500 service hours (20,000 miles), more preferably about 1,000 service hours (40,000 miles) and most preferably about 2,500 service hours (100,000 miles).

The basic mechanism for the controlled release of the SCA composition from the encapsulated SCA pellet or tablet is based on diffusion through the polymeric coating material. More particularly, water or water vapor from the coolant system permeates from the outside of the encapsulated pellet or tablet, through the polymeric coating and to the core containing the water soluble SCA active components. Once the water reaches the SCA core, it acts as a solvent and begins to dissolve the water-soluble SCA composition, forming an aqueous SCA solution. The SCA solution permeates back through the polymeric coating, thereby releasing the SCA composition to the coolant system in a controlled manner.

Accordingly, an important characteristic of the polymeric coating necessary in determining its effectiveness as a controlled release coating is its moisture barrier properties. A polymeric coating material having good moisture barrier properties greatly reduces the rate of dissolution of the SCA composition core, thereby providing more constant controlled release. Two classes of polymers having good moisture barrier properties which have been found to be particularly suitable for use as the coating material are water-insoluble film formers and water-based emulsion polymer.

Suitable film forming polymers include, for example, copolymers and terpolymers of vinylidene chloride mononier and ethylenically unsaturated comonomers, including for example, lower alkyl acrylates and methacrylates, acrylic acid and acrylonitrile. Other film forming polymers include vinylidene chloride-vinyl chloride and mixtures thereof. Examples of vinylidene chloride-based copolymers are provided in Table 2. A particular preferred film forming polymer is the vinylidene chloride terpolymer: vinylidene chloride-methylacrylate-methylmethacrylate, sold under the tradename Daran 8680 by Hampshire Chemical Corporation.

Suitable water-based emulsion polymers include copolymers and terpolymers of vinyl versatate and ethylenically unsaturated comonomers, including for example, vinyl acetate and lower alkyl acrylates and methacrylates. A particularly preferred water-based emulsion polymer is vinyl acetate-butylacrylate-vinyl versatate polymer, sold under the tradename Versaflex 1 by Hampshire Chemical Corporation.

The polymeric coating material may be applied to the SCA composition core by spray coating, macroencapsulation or any other coating technique well known to practitioners in the art. Preferably, the polymeric coating material is an aqueous dispersion latex which is applied to the SCA core pellet or tablet by drum or pan coating. The amount of coating material to be applied to the SCA core is dependent upon the desired controlled release characteristics of the resulting coated tablet or pellet. An increase in the amount of coating material will result in an decrease of the rate of release of the SCA composition. Preferably, the weight percent of the coating material is from about 1.0 to about 40.0%/wt. based on the total weight of the SCA tablet, more preferably from about 2.0 to about 30%/wt. and most preferably from about 5 to about 25%/wt.

In order to determine the controlled-release effectiveness of different polymeric coating materials, a number of samples were prepared by the application of an aqueous dispersion of a polymeric coating material onto pre-formed tablets containing a mixture of SCA active components. Coating materials used in preparing the samples are provided in Table 2.

Although the coated SCA tablets or pellets may be introduced directly into the coolant system, such a delivery method can result in the polymeric coating material itself fouling the system. In order to prevent the water insoluble polymeric coating material from being introduced into the coolant system along with the SCA additive, the coated tablets are placed within a filtering environment such that the filter can release the water-soluble SCA composition into the coolant system but trap and retain the larger particles of polymeric coating material. The selection of such a filtering environment is dependent on whether the coolant system is a circulating or non-circulating system. In circulating systems such as diesel engine coolant systems, coolant filters currently are being utilized in order to introduce chemical supplemental coolant additives to the cooling system. An example of such a filter device is the WF2071 Coolant filter, sold by Fleetguard™ which as a bypass filter, with about 3% coolant flow going to the filter at any given time.

TABLE 2

| SAMPLE # | COATING COMPOSITION | %/wt. |
|---|---|---|
| 1 | Vinylidene chloride-methylacrylate-methyl-methacrylate[1] | 20 |
| 2 | Vinylidene chloride-methylacrylate-methyl-methacrylate[1] | 20 |
| 3 | Vinylidene chloride-methylmethacrylate-acrylonitrile[2] | 20 |
| 4 | Vinyl acetate-ethyl acrylate[3] | 20 |
| 5 | Vinyl acetate-dibutyl maleate[4] | 20 |
| 6 | Vinylacetate-butylacrylate-vinyl versatate[5] | 16 |
| 7 | Vinylidene chloride-methylacrylate-methyl-methacrylate[1] | 30 |
| 8 | Vinylidene chloride-methylmethacrylate[6] | 20 |
| 9 | Vinylidene chloride-methylacrylate-methyl-methacrylate[1] | 40 |
| 10 | Polyurethane[7] | 20 |
| 11 | Polyurethane[8] | 20 |
| 12 | Vinylidene chloride-butyl acrylate-acrylonitrile[9] | 20 |
| 13 | Vinylidene chloride-methylacrylate-acrylic acid[10] | 20 |
| 14 | Vinylidene chloride-butyl acrylate[11] | 20 |
| 15 | Polystyrene[12] | 20 |
| 16 | Polyvinylidene chloride terpolymer[13] | 20 |
| 17 | Vinylidene chloride-methylacrylate-methyl-methacrylate[1] | 20 |
| 18 | Vinylacetate-butylacrylate-vinyl versatate[5] | 5 |
| 19 | Vinylacetate-butylacrylate-vinyl versatate[5] | 10 |
| 20 | Vinylidene chloride-methylacrylate-methyl-methacrylate[1] | 20 |
| 21 | Vinylacetate-butylacrylate-vinyl versatate[5] | 15 |
| 22 | Vinylacetate-butylacrylate-vinyl versatate[5] | 15 |
| 23 | Vinylidene chloride-methylacrylate-methyl-methacrylate[1] | 20 |

[1]Daran 8680; [2]Daran SL 112; [3]Everflex MA; [4]Everflex BG; [5]Versaflex 1; [6]Daran 8550; [7]Impranil DLH; [8]Bayhydrol; [9]Daran SL 143; [10]Daran 8300; [11]Versaflex 9; [12]Darex 670L; [13]Daratzk XB3631;

Of the several coating materials provided in Table 2, it was discovered that vinyl acetate-dibutyl maleate (Sample 5) and vinylidene chloride (Sample 14) were not acceptable coating materials due to the sticky nature of the polymers. Polystyrene (Sample 15) and polyvinylidene terpolymer (Sample 16) were found to be non film formers.

Bench Tests were conducted on several of the samples in order to observe the appearance and overall release factor of the SCA components from the tablets. The Bench Test consisted of placing about 10.5 g. coated tablets in a 750 ml prediluted heavy duty antifreeze, COMPLEAT EG (a solution of 50% ethylene glycol/50% water) in a resin kettle heated to a temperature of about 95–100° C. for fourteen days. The results of Bench Test are provided in Table 3.

TABLE 3

BENCH TEST FOR APPEARANCE

| Sample | Appearance after 14 days | Overall Release Factor |
|---|---|---|
| No Coating | tablets totally disintegrated | substantial |
| Sample 1 | tablet coatings intact, no visual disintegration | low to moderate |
| Sample 2 | tablet coatings intact, no visual disintegration | low to moderate |
| Sample 3 | tablet coatings intact, no visual disintegration | moderate to substantial |
| Sample 4 | tablets totally disintegrated | substantial |
| Sample 6 | tablet coatings intact but shrivelled - collapsed coating | substantial |
| Sample 7 | tablet coatings intact, no visual disintegration | low to moderate |

The Bench Tests revealed that tablet samples Sample 1, Sample 2 and Sample 7 coated with vinylidene chloride-methacrylate-methylmethacrylate (DARAN 8680) were potentially outstanding polymer coating materials. The tablet samples coated with vinylacetate-butylacrylate-vinyl versatate (VERSAFLEX 1) did not appear as promising.

In order to determine the effectiveness of the coated SCA tablets or pellets, a Simulated Service Rig Test was developed based on the "Standard Test Method for Simulated Service Corrosion Testing of Engine Coolants (ASTM designation D 2570-91)", which is a test for evaluating the effect of a circulating engine coolant on metal test specimens and automotive cooling systems under controlled, essentially isothermal laboratory conditions. This standard test was modified by the addition of a filter adaptor.

The modified Simulated Service Rig Test is designed to characterize the time release properties of the coated SCA tablets over a designated period of time. The test equipment include a 4000 ml plastic graduate, a top loading balance and a simulated service test rig as described in ASTM D 2570-91. For each test, the filter adapter of the rig was isolated from the rig by shutting off the valves and the rig was filled with a 50% glycol-based antifreeze. The coolant was allowed to circulate in the rig for at least ten minutes. The weight of each coated SCA sample to be evaluated was measured and introduced into a filter shell, the filter shell was screwed into the filter adapter and the valves from and to the filter adapter were reopened. The temperature of the rig was monitored to ensure that the temperature was about 190° F. ±5° F. Periodically during the course of the test, small samples (4.0 to 16.0 oz.) were removed from the rig for analysis of the major components of the tablets. Each test was conducted for a minimum of twenty days or until data analysis indicated a full time release of the SCA composition.

The following examples demonstrate the effectiveness of particular controlled release SCA compositions and are intended to be merely illustrative of the present invention. In each of the examples, the % release factor was determined by calculating the difference between the amount of a given SCA component in the coolant system at time t and the amount of that component in the starting coolant composition at time 0, dividing by the total amount of that component in the SCA tablets at time 0, and then multiplying by 100. For example, in Example 1, the amount of Boron (as B) in the antifreeze coolant composition at time 0 (i.e. before any SCA tablets were added) was determined to be 21 ppm. The total amount of Boron (as B) in the SCA tablets was determined to be 37 ppm, based on 5165 ppm of SCA added and 0.71% Boron (as B) in the SCA. After two hours of contact time with the SCA tablets (time t=2 hours), a sample was taken from the treated coolant and the Boron (as B) was determined to be 51 ppm. The % release factor was calculated to be 81% as follows:

$$[(51 \text{ ppm} - 21 \text{ ppm})/37 \text{ ppm}] \times 100 = 81$$

EXAMPLE 1

A control sample was prepared by introducing into the filter shell a dosage of 72.9 grams of uncoated tablets per 3.54 gallons of coolant. After two hours, the tablets were substantially dissolved and by the end of twenty four hours, nearly complete dissolution was observed as shown in the following Table 4.

TABLE 4

Control Test - Uncoated Tablets
Percent Release of Active SCA Components

| Active SCA Components | 0 hour | % release 2 hours | % release 1 day |
|---|---|---|---|
| Boron as B | 0 | 81 | 87 |
| Nitrate as $NO_3$ | 0 | 97 | 100 |
| Nitrite as $NO_2$ | 0 | 83 | 100 |
| Molybdate as Mo | 0 | 106* | 97 |
| Orthophosphate as $PO_4$ | 0 | 65 | 93 |

* release factors greater than 100% are obtained due to experimental error in the ppm measurement of an active SCA component at either time 0 or time t (e.g. 2 hours) or both

EXAMPLE 2

Tablets having the SCA formulation of Example 1 were coated with the Sample 7 sample vinylidene chloride-methylacrylate-methylmethacrylate (DARAN 8680) such that the final coated product was 30% coating and 70% active SCA. 250 grams of the coated tablets were added to 10 gallons of coolant. Specimens were analyzed at periodic intervals over 20 days to determine the amount of SCA component in the coolant system. The results revealed a controlled release of the SCA composition over 20 days and a combined concentration level of nitrite and molybdate in excess of 800 ppm as shown in Tables 5A and 5B.

TABLE 5A

SCA Tablets with 30% Sample 7 Coating
Percent Release of SCA Active Components

| SCA COMPONENTS | 0 | DAY 6 | 13 | 20 |
|---|---|---|---|---|
| Boron as B | 0 | 7 | 68 | 95 |
| Nitrate as $NO_3$ | 0 | 6 | 78 | 82 |
| Nitrite as $NO_2$ | 0 | 10 | 68 | 68 |
| Molybdate as Mo | 0 | 8 | 78 | 100 |
| Orthophosphate as $PO_4$ | 0 | n/a | 24 | n/a |

TABLE 5B

SCA Tablets with 30% Sample 7 Coating
Nitrite and Molybdate Levels (in ppm)

| SCA COMPONENTS | 0 | DAY 6 | 13 | 20 |
|---|---|---|---|---|
| Nitrite as $NO_2$ | 760 | 810 | 1100 | 1100 |
| Molybdate as Mo | 232 | 243 | 334 | 363 |

EXAMPLE 3

Tablets having the SCA formulation of Example 1 were coated with the Sample 6 sample vinylacetate-butylacrylate-vinyl versatate (Versaflex 1) such that the final coated product was 16% coating and 84% active SCA. 250 grams of the coated tablets were added to 10 gallons of coolant. Specimens were analyzed at periodic intervals over 43 days to determine the amount of SCA component in the coolant system. The results revealed a controlled release of the SCA composition over a 29 day period and a concentration level of nitrite and molybdate in excess of 800 ppm as shown in Tables 6A and 6B.

TABLE 6A

SCA Tablets with 16% Sample 6 Coating
Percent Release of SCA Active Components

| SCA COMPONENTS | 0 | 2 | 5 | 8 | 14 | 20 | 22 | 29 |
|---|---|---|---|---|---|---|---|---|
| Boron as B | 0 | 13 | 18 | n/a | 43 | 49 | 52 | 67 |
| Nitrate as $NO_3$ | 0 | 9 | 16 | 19 | 28 | 47 | 65 | 78 |
| Nitrite as $NO_2$ | 0 | 2 | 14 | 28 | 38 | 42 | 54 | 73 |
| Molybdate as Mo | 0 | 0 | 16 | n/a | n/a | 28 | 26 | 66 |
| Orthophosphate as $PO_4$ | 0 | 0 | 0 | 0 | 0 | 9 | 22 | 48 |

TABLE 6B

SCA Tablets with 16% Sample 6 Coating
Nitrite and Molybdate Levels (in ppm)

| SCA COMPONENTS | 0 | 2 | 5 | 8 | 14 | 20 | 22 | 29 |
|---|---|---|---|---|---|---|---|---|
| Nitrite as $NO_2$ | 730 | 740 | 800 | 870 | 920 | 940 | 1000 | 1100 |
| Molybdate as Mo | 245 | 245 | 266 | n/a | n/a | 282 | 279 | 333 |

EXAMPLE 4

Tablets having the SCA formulation of Example 1 were coated with the Sample 19 sample vinylacetate-butylacrylate-vinyl versatate (Versaflex 1) such that the final coated product was 10% coating and 90% active SCA. 249.38 grams of the coated tablets were added to 10 gallons of coolant. Specimens were analyzed at periodic intervals over 21 days to determine the amount of SCA component in the coolant system. The results revealed a controlled release of the SCA composition over a 21 day period and a combined concentration level of nitrite and molybdate in excess of 800 ppm as shown in Tables 7A and 7B.

TABLE 7A

SCA Tablets with 10% Sample 19 Coating
Percent Release of SCA Active Components

| SCA COMPONENTS | 0 | 1 | 6 | 14 | 21 |
|---|---|---|---|---|---|
| Boron as B** | 0 | n/a | n/a | n/a | n/a |
| Nitrate as $NO_3$ | 0 | 28 | 46 | 66 | 74 |
| Nitrite as $NO_2$ | 0 | 26 | 45 | 64 | 94 |
| Molybdate as Mo | 0 | 52 | 78 | 95 | 99 |
| Orthophosphate as $PO_4$ | 0 | 57 | 78 | 90 | 101* |

*See previous note to Table 4
**Boron data for Sample 19 coating was not determined

TABLE 7B

SCA Tablets with 10% Sample 19 Coating
Nitrite and Molybdate Levels (in ppm)

| SCA COMPONENTS | DAY | | | | | |
|---|---|---|---|---|---|---|
| | 0 | 1A* | 1B* | 6 | 14 | 21 |
| Nitrite as $NO_2$ | 940 | 1100 | 980 | 1100 | 1200 | 1400 |
| Molybdate as Mo | 332 | 415 | 337 | 380 | 407 | 414 |

*Coolant was added on Day 1a due to coolant loss; this subsequent dilution reduced nitrite and molybdate levels on Day 1B Although the Bench Test For Appearance appeared to indicate that vinylacetate-butylacrylate-vinyl versatate (Versaflex 1) had limited potential as a suitable polymeric coating material for delivering an effective controlled release of the SCA active components to a coolant system, it was surprisingly discovered that this vinyl versatate terpolymer is quite effective for providing controlled release of the SCA active components. The tablets coated with Versaflex I congeal to form a large mass of tablets when exposed to heat. Thus, when these tablets are exposed to the hot engine coolant they congeal into a large mass, the result of which is that the tablets in the center of the large mass take a significantly longer period of time to release their SCA active components than the tablets located closer to the surface of the large mass.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A controlled release supplemental coolant additive for use in an engine coolant system comprising:
   a) a core containing a water-soluble composition comprising a supplemental coolant additive composition; and
   b) a water insoluble, water permeable, polymeric coating material encapsulating said core comprising terpolymers containing vinyl acetate, vinyl versatate, and alkyl(meth)acrylate monomer subunits.

2. The controlled release supplemental coolant additive in accordance with claim 1, wherein said polymeric coating material is spray coated onto said core.

3. The controlled release supplemental coolant additive in accordance with claim 1, wherein the weight percent of the coating material is from about 1.0 to about 40.0 %/wt. based on the total weight of the controlled release supplemental coolant additive.

4. The controlled release supplemental coolant additive in accordance with claim 3, wherein the weight percent of the coating material is from about 5.0 to about 25.0 %/wt.

5. The controlled release supplemental coolant additive in accordance with claim 1, wherein said supplemental coolant additive composition comprises at least one active ingredient selected from the group consisting of buffering components, cavitation liner pitting inhibitors, metal corrosion and hot surface corrosion inhibitors, defoaming agents, hot surface deposition and scale inhibitors, dispersant agents and mixtures thereof.

6. The controlled release supplemental coolant additive in accordance with claim 1, wherein said supplemental coolant additive composition comprises a mixture of (a) at least one alkali metal or ammonium molybdate and (b) at least one alkali metal or ammonium nitrite.

7. The controlled release supplemental coolant additive in accordance with claim 6, wherein said supplemental coolant additive composition further comprises at least one other supplemental coolant additive selected from the group consisting of alkali metal or ammonium phosphates, alkali metal or ammonium borates, alkali metal or ammonium nitrates, alkali metal or ammonium silicates, alkali metal or ammonium salts of one or more neutralized dicarboxylic acids and tolyltriazole.

8. The controlled release supplemental coolant additive in accordance with claim 1, wherein said core further comprises an amount of a binder sufficient to maintain said core in the form of a tablet or pellet.

9. The controlled release supplemental coolant additive in accordance with claim 8, wherein said binder is selected from the group consisting of polyvinyl pyrrolidone, sodium acrylate, sodium polyacrylate, carboxymethylcellulose, sodium carboxymethylcellulose, sodium hydroxypropylcellulose, corn starch, microcrystalline cellulose, propylene glycol, ethylene glycol, sodium silicate, potassium silicate, methacrylate/acrylate copolyers, sodium lignosulfonate and water.

10. The controlled release supplemental coolant additive in accordance with claim 1, wherein said core further comprises a die release agent.

11. The controlled release supplemental coolant additive in accordance with claim 10, wherein said die release agent is selected from the group consisting of calcium stearate, magnesium stearate, zinc stearate, stearic acid, alkylene glycols, polyalkylene glycol, polyoxypropylene-polyoxyethylene block copolymers, microcrystalline cellulose, kaolin, attapulgite, magnesium carbonate, fumed silica, magnesium silicate, calcium silicate, silicones, mono- and dicarboxylic acids and corn starch.

* * * * *